(12) United States Patent
Guillouard et al.

(10) Patent No.: US 8,121,034 B2
(45) Date of Patent: *Feb. 21, 2012

(54) METHOD FOR THE OPTIMISED MANAGEMENT OF RESOURCES IN A TERMINAL COMPRISING MULTIPLE INTERFACES

(75) Inventors: Karine Guillouard, Chantepie (FR);
Stéphane Atheo, Orvault (FR); David Blanchet, La Bouëxiere (FR);
Jean-Marie Bonnin, Corps Nuds (FR);
Lucian Suciu, Cesson Sevigne (FR)

(73) Assignee: France Telecom, Paris (FR)

( * ) Notice: Subject to any disclaimer, the term of this patent is extended or adjusted under 35 U.S.C. 154(b) by 67 days.

This patent is subject to a terminal disclaimer.

(21) Appl. No.: 12/066,173

(22) PCT Filed: Sep. 4, 2006

(86) PCT No.: PCT/EP2006/008597
§ 371 (c)(1),
(2), (4) Date: Jan. 5, 2009

(87) PCT Pub. No.: WO2007/028555
PCT Pub. Date: Mar. 15, 2007

(65) Prior Publication Data
US 2009/0129274 A1 May 21, 2009

(30) Foreign Application Priority Data
Sep. 9, 2005 (FR) ...................................... 05 09202

(51) Int. Cl.
*G01R 31/08* (2006.01)
(52) U.S. Cl. ...................................... 370/235; 370/230

(58) Field of Classification Search .......... 370/200–253, 370/468, 411, 255–256, 257–258, 402–410, 370/420–426; 455/517, 509
See application file for complete search history.

(56) References Cited

U.S. PATENT DOCUMENTS
5,953,318 A * 9/1999 Nattkemper et al. ......... 370/236
(Continued)

FOREIGN PATENT DOCUMENTS
EP 1 633 092 3/2006
(Continued)

OTHER PUBLICATIONS
XP-000735205, Feb. 1998, IEEE vol. 45. No. 1, Ting and Maria C. Yuang, Dynamic Multithreshold Rate Control Machanisms for Supporting ABR Traffic in ATM Networks.*
(Continued)

*Primary Examiner* — Pao Sinkantarakorn
*Assistant Examiner* — Iqbal Zaidi
(74) *Attorney, Agent, or Firm* — David D. Brush; Westman, Champlin & Kelly, P.A.

(57) ABSTRACT

A method is provided for the transmission of data flows through multiple interfaces. The method includes: comparing a maximum throughput value offered by an interface with a cumulative value resulting from a sum of the throughputs attributed to the flows effectively travelling through the interface; and switching a flow to another interface when the maximum throughput value offered is less than the cumulative value. The method can be used to redirect data flows to an interface other than the current interface when a congestion is detected in the comparison step and to perform optimum dynamic management of the resources of different interfaces as a function of the operating conditions of the interfaces.

11 Claims, 2 Drawing Sheets

U.S. PATENT DOCUMENTS

| | | | | |
|---|---|---|---|---|
| 6,768,738 | B1 | 7/2004 | Yazaki et al. | 370/392 |
| 2001/0024452 | A1* | 9/2001 | Liu et al. | 370/468 |
| 2003/0026207 | A1* | 2/2003 | Loguinov | 370/235 |
| 2003/0078065 | A1* | 4/2003 | Hoagland et al. | 455/517 |
| 2006/0077964 | A1* | 4/2006 | Wu et al. | 370/352 |

FOREIGN PATENT DOCUMENTS

| | | |
|---|---|---|
| WO | WO 2005/125116 | 12/2005 |

OTHER PUBLICATIONS

André, F. et al. Optimized Support of Multiple Wireless Interfaces within an.

International Preliminary Report on Patentability from counterpart foreign Application No. PCT/EP2006/008597.

Suciu, L. et al. "Achieving 'Always Best Connected' Through Extensive Profile Management," $9^{th}$ International Conference on Personal Wireless Communications, Sep. 2004.

Rose, O. "The Q-bit Scheme—Congestion Avoidance Using Rate Adoption," Computer Communication Revenue, ACM, New York, NY, US, vol. 22, No. 2, Apr. 1, 1992.

Loguino, D. et al. "Increase-Decrease Congestion Control for Real-Time Streaming: Scalability," Proceedings IEEE Infocom 2002. The Conference on Computer Communications. $21^{st}$ Annual Joint Conference of the IEEE Computer and Communications Societies. New Tork, NY, Jun. 23-27, 2002, Communications, vol. 1 of 3. Conf21, Jun. 23, 2002.

Ting, P.C. et al. "Dynamic Multithreshold Rate Control Mechanisms for Supporting ABR Traffic in ATM Networks," IEEE Transactions on Industrial Electronics, IEEE Service Center, Piscata Way, NJ, US, vol. 45, No. 1, Feb. 1998.

Qian, Wang et al. "TCP-Friendly Congestion Control Schemes in the Internet," Info-Tech and Info-Net, 2001. Proceedings ICII 2001-Beijing, 2001 International Conferences on Oct. 29-Nov. 1, 2001 Piscata Way, NJ, US, IEEE, vol. 2, Oct. 29, 2001.

Francis, M. et al. "A Flow Control Framework for ABR Services in Wireless/Wired ATM Networks," Vehicular Technology Conference, 1999 IEEE $49^{th}$ Houston, TX, US May 16-20, 1999, Piscata Way, NJ, US, IEEE, vol. 2, May 16, 1999.

Blado, N. et al. "RTCP Feedback Based Transmission Rate Control for 3G Wireless Multimedia Streaming," Personal, Indoor and Mobile Radio Communications, 2004. PIMRC 2004. $15^{th}$ IEEE International Symposium on Barcelona, Spain Sep. 5-8, 2004, Piscata Way, NJ, US, IEEE, vol. 3, Sep. 5, 2004.

Office Action dated Feb. 4, 2010 for corresponding U.S. Appl. No. 12/066,038.

Final Office Action dated Sep. 14, 2010 for corresponding U.S. Appl. No. 12/066,038.

International Search Report dated Oct. 20, 2006 for corresponding International Application No. PCT/EP2006/008597, filed Sep. 4, 2006.

French Search Report dated Apr. 12, 2006 for corresponding French Application No. FR0509202, filed Sep. 9, 2005.

International Search Report dated Dec. 7, 2006 for corresponding International Application No. PCT/EP2006/008654 filed Sep. 6, 2006.

French Search Report dated Apr. 12, 2006 for corresponding French Application No. FR0509203 filed Sep. 9, 2005.

Office Action from the United States Patent and Trademark Office for corresponding U.S. Appl. No. 12/066,038 dated Jul. 19, 2011.

* cited by examiner

METHOD FOR THE OPTIMISED MANAGEMENT OF RESOURCES IN A TERMINAL COMPRISING MULTIPLE INTERFACES

CROSS-REFERENCE TO RELATED APPLICATIONS

This Application is a Section 371 National Stage Application of International Application No. PCT/EP2006/008597, filed Sep. 4, 2006 and published as WO 2007/028555 on Mar. 15, 2007, not in English.

FIELD OF THE DISCLOSURE

The present disclosure relates to a method for the transmission of data within a telecommunications system including at least one terminal capable of exchanging data streams with numerous communications networks through a plurality of interfaces.

BACKGROUND OF THE DISCLOSURE

A method of this kind is described in an article "Achieving 'Always Best Connected' through Extensive Profile Management", presented at the 9th International Conference on Personal Wireless Communications, September 2004.

The prior art method enables detection of the loss of an interface during the operation of the terminal, and the almost instantaneous rerouting of a stream to which a lost interface will have been initially assigned, to another interface using a first decision-making algorithm called a fast algorithm which theoretically enables the saving of stream continuity. A second decision-making algorithm called a slow algorithm is furthermore provided to obtain an optimum distribution of the streams over the various remaining interfaces, after any reassigning of the stream or streams by the fast algorithm. Furthermore, an appearance or re-appearance of an interface will be taken into account by the fast algorithm which could redirect streams traveling over other less advantageous interfaces towards this new interface, such a redirection being then followed by implementation of the slow algorithm in order to optimally distribute the stream over the various existing interfaces.

However, the inventors have noted that the consecutive implementation of dual fast and slow algorithms does not provide for optimum operation of the telecommunications system, and more particularly of the terminal, in certain situations which will unfailingly occur when said system operates in real conditions. These particular conditions include one highly probable situation in which an interface does not disappear totally but is disturbed temporarily so that this interface no longer provides the streams designed to cross it with anything other than a total throughput rate that is very small when compared with the throughput rate initially planned for this interface. In such a situation, according to the teaching of the above-mentioned prior art, it is the slow algorithm that will take corrective measures in order to find a new optimum distribution of the streams: this entails a risk of introducing a period of latency with a duration that is big enough for the streams traveling through the saturated interface to be quite simply interrupted and lost, and this is unacceptable.

SUMMARY

One aspect of the present disclosure is directed to a method of data transmission, which includes:
at least one step of comparison between a maximum throughput rate value offered by an interface through which a particular stream travels and a cumulative value resulting from a sum of throughput rate values to be assigned to the streams effectively traveling through said interface, and
at least one switching step during which another interface is assigned to said stream when the maximum throughput rate value offered is lower than the cumulative value.

An embodiment of the invention enables the redirecting of one or more data streams to an interface other than their current interface as soon as the comparison step detects a congestion, or even a saturation of this current interface. This is not possible in the prior art in which a fast switching of this kind is possible only in the event of a total loss of the current interface. Thus, an embodiment of the present invention enables optimum and dynamic management of bandwidth proper to the various interfaces, suited to variations in conditions of operation of said interfaces.

According to an advantageous mode of implementation of the invention, the method described here above furthermore includes a step of selection of that one of the streams, the minimum throughput rate of which makes it possible, when it is subtracted from the sum of the values assigned to the streams traveling through the interface considered, to obtain a value that is closest to that of the maximum throughput rate offered by this interface, the stream thus selected being then intended for being subjected to a switching step.

A selection step of this kind enables the exploitation of the entire bandwidth of an interface in subjecting, to the switching step, only the stream or streams whose disappearance will give a total transmission throughput rate through the interface considered that is as close as possible to the throughput rate made effectively possibly by this interface at a given point in time.

According to one particular mode of implementation of the invention, the method described here above furthermore includes a step of classification, in a predetermined order of priority, of the various streams assigned to each interface, the streams that have to be subjected to a switching step being then intended for selection by ascending order of priority.

The classification step thus makes it possible to give preference to the transmission of certain types of data relative to others. For example, data defining stimuli having to be restituted in real time to a user of the terminal, such as data conveyed in an audio stream or a video stream in the context of a videophony application, could be considered to have priority over text data for the transmission of which a latency could seem to be acceptable because it is imperceptible to the user who, on the contrary, could not avoid being inconvenienced by an interruption, even a momentary interruption, of the audio or video stimuli. Thus, in the event of saturation of the interface conveying these three streams, the textual data stream, which has been preliminarily assigned an order of priority lower than the one assigned to the audio and visual streams, will be subjected to the switching step in such a way as to release bandwidth to the benefit of other streams having higher priority.

According to an advantageous variant of the invention, several acceptable nominal throughput rate values could be determined for at least one of the streams during the determining step, the smallest of said nominal throughput rates constituting the minimum throughput rate proper to said stream, any subjecting of the stream considered to the switching step being inhibited so long as the throughput rate effectively allocated by the interface to said stream considered has not been reduced to its minimum value.

The existence of a scale of several acceptable nominal throughput rate values for one or more streams going through an interface will enable the adjustment by stages of the different throughput rates of the streams provided with such scales of values and therefore permits greater precision in a distribution of bandwidth between various simultaneous streams. In particular, in the event of saturation of an interface, it can be chosen preferably to reduce the throughput rates of the non-priority streams down to their minimum values, without the throughput rates of the priority streams being thereby altered.

According to a particular mode of implementation of this variant, the switching step could be inhibited so long as the throughput rates effectively allocated by the interface to the streams that cross it have not all been reduced to their respective minimum values.

In this particular embodiment, it would be deemed to be preferable to reduce throughput rate distributed over all the streams that go through a saturated interface, whether or not the streams are priority streams, before effectively subjecting one or more of these streams to the switching step in ascending order of priority.

According to a preferred mode of implementation of this variant, a method such as the one described here above is characterized in that it furthermore includes a step for increasing the throughput rate that follows a switching step and is intended for increasing the throughput rate of a particular stream subjected to it by selection of its nominal throughput rate value immediately higher than its current throughput rate.

The execution of one or more increasing steps after the non-priority streams have had their throughput rates reduced to their nominal values or after they have been switched to other interfaces will authorize a new assigning of resources thus released to the benefit of the priority streams, thus enabling the optimizing of the management of the bandwidth achieved through an embodiment of the invention to be completed.

An embodiment of the invention also relates to a signal, taken as a product obtained directly during the implementation of a method compliant with the above description, this signal being intended for the conveying of a data stream through an interface selected from a plurality of such interfaces included in a terminal, said signal including at least one field defining a nominal throughput rate intended for the forming of a component of a cumulative value resulting from a sum of throughput rate values to be assigned to the streams effectively traveling through said interface, said cumulative value being intended for comparison, within said terminal, with an available throughput rate offered by this interface.

The method of transmission described here above may be implemented in various ways, especially in wired form or in software form. An embodiment of the invention therefore also relates to a computer program product downloadable through a telecommunications network and/or stored in a memory of a central processing unit and/or stored in a memory carrier designed to cooperate with a reader of said central processing unit, said program being designed to be implemented within a terminal capable of exchanging data streams with numerous communications networks through a plurality of interfaces, said program including:

at least one instruction ordering the execution of a step of comparison between a maximum throughput rate value offered by an interface through which a particular stream travels and a cumulative value resulting from a sum of throughput rate values assigned to the streams effectively traveling through said interface, and at least one instruction ordering the execution of a switching step during which another interface is assigned to said stream when the maximum throughput rate value offered is lower than the cumulative value.

According to a hardware aspect, an embodiment of the invention also relates to a data carrier in which there is stored a computer program compliant with the above description or intended for the storage, with reference to an identifier designating a data stream conveyed by a signal as defined further above, of at least one value of a minimum throughput rate proper to said data stream.

According to another of its hardware aspects, an embodiment of the invention also relates to a telecommunications system including at least one terminal capable of exchanging data streams with numerous communications networks through a plurality of interfaces, the system being characterized in that it includes:

means of comparison between a maximum throughput rate value offered by an interface through which a particular stream travels and a cumulative value resulting from a sum of throughput rate values to be assigned to the streams effectively traveling through said interface, and switching means capable of assigning another interface to said particular stream when the maximum throughput rate value offered is lower than the cumulative value.

According to yet another of its hardware aspects, an embodiment of the invention also relates to a terminal capable of exchanging data streams with numerous communications networks via a plurality of interfaces, the terminal being characterized in that it includes:

means of comparison between a maximum throughput rate value offered by an interface through which a particular stream travels and a cumulative value resulting from a sum of throughput rate values assigned to the streams effectively traveling through said interface, and switching means capable of assigning another interface to said particular stream when the maximum throughput rate value offered is lower than the cumulative value.

BRIEF DESCRIPTION OF THE DRAWINGS

The characteristics mentioned here above as well as other characteristics shall appear more clearly from the following description of an example of an embodiment, said description being made with reference to the appended drawings, of which.

DETAILED DESCRIPTION OF ILLUSTRATIVE EMBODIMENTS

Figure 1:
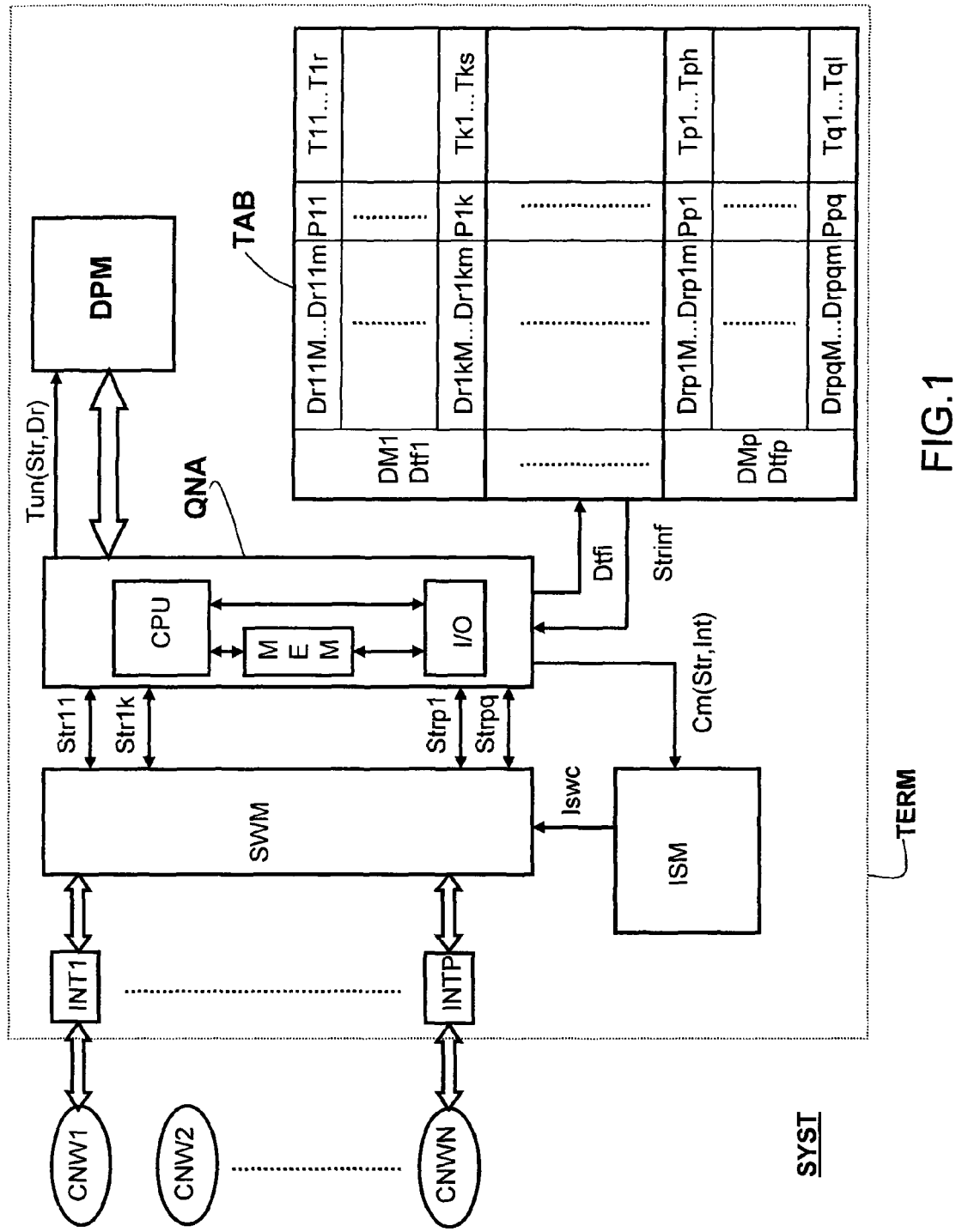
FIG. 1 is a functional diagram that illustrates a telecommunications system in which an embodiment of the invention is implemented.

FIG. 1 gives a schematic view of a telecommunications system SYST including at least one terminal TERM capable of exchanging data streams (Str11 . . . Str1k) . . . (Strp1 . . . Strpq) with N distinct communications networks CNW1, CNW2, . . . , CNWN through a plurality of interfaces INT1 . . . INTP. These various communications networks could include one or more STN (Switched Telephone Network) type wired networks, one or more GSM (Global System for Mobiles) or UMTS (Universal Mobile Telecommunications Systems) type networks or again one or more wireless local area networks such as networks compliant with the IEEE 802.3, IEEE 802.11 or IEEE 802.15 standards. The different data streams (Str11 . . . Str1k) . . . (Strp1 . . . Strpq)

are to be transmitted, through analysis means QNA, to means DPM for processing data conveyed by said streams.

The telecommunications system SYST compliant with an embodiment of the invention includes communications means SWM within the terminal TERM that are capable of switching a particular stream, initially traveling through a given interface, to a new interface when the maximum throughput rate value offered by this given interface becomes lower than a sum of throughput rate values assigned to the streams traveling through said interface.

In the example illustrated here, the analysis means QNA contains a central processing unit CPU capable of controlling input/output means I/O and a memory MEM in which there is stored, in the form of a sequence of instructions, a method according to an embodiment of the invention aimed at obtaining an optimization of the distribution of the streams (Str11 ... Str1k) ... (Strp1 ... Strpq) on the various interfaces INT1 ... INTP. More specifically, the analysis means QNA are capable especially of making a comparison between the minimum throughput rate of at least one particular stream, for example a value Dr1km assigned to the stream Str1k initially traveling in transit through the interface INT1, and an available throughput rate offered by the interface through which this particular stream Str1k flows.

In the present example, the analysis means QNA include means for setting effective throughput rates of the streams (Str11 ... Str1k) ... (Strp1 ... Strpq) that are to go through the interfaces INT1 ... INTP, said setting means being capable of sending a setting signal Tun(Strj,Drj) to an entity that has generated a particular stream, this setting signal carrying at least one identifier of a stream Str, having a value Dr of the throughput rate that must be allocated to this stream Str, said setting signal being aimed at informing this entity of the fact that the throughput rate of the stream considered is too great and must be reduced at the source, which will be constituted either by the processing means DPM when the stream concerned is an outgoing stream, as is the case here, or by a remote terminal when the stream considered is an incoming stream, in which case the setting signal will be sent to it through the interface assigned to this stream.

In the mode of implementation described here, the terminal TERM includes means of storage of a table TAB in which, within segments each pertaining to an interface INTi (for i=1 to P) pieces of information on this interface are grouped together, especially information on the maximum throughput rate DMi made available by this interface INTi and the cumulative throughput rate Dtfi of the various streams to which this interface has been assigned. The analysis means QNA are intended for the recording, within this table TAB, of the information on the throughput rates of the different streams going through the various interfaces and for the extraction from this table TAB of the information Strinf pertaining to these streams. If, in the example described here, the table TAB is recorded outside the analysis means QNA, this table TAB could be stored within the memory MEM itself included in the analysis means QNA in other modes of implementation of the invention.

In the example of implementation of the invention described herein, each segment of the table TAB furthermore includes a plurality of scales of nominal throughput rate values each assigned to a stream going through the interface considered and conveyed in fields included within said streams, for example scales of values assigned to the streams Str11 ... Str1k going through the interface INT1 and referenced (Dr11M ... Dr11m) ... (Dr1kM ... Dr1km) where the index "M" indicates an upper limit and the index "m" indicates a lower limit, the lowest of the nominal throughput rates Dr1jm assigned to a stream Str1j (for j=1 to k) constituting the minimum throughput rate proper to said stream Str1j, each of these streams being furthermore provided with a degree of priority P11 ... P1k that is proper to it, each stream Str11 ... Str1k being furthermore associated with a predefined set (T11 ... T1r) ... (Tk1 ... Tks) of types of interfaces with which this stream is compatible, arranged in a predetermined order of preference.

The means of analysis QNA are capable of detecting a saturation of a given interface, for example the interface INT1, which will be expressed by the fact that a cumulative value Dtf1 of the throughput rates of the streams (Str1 ... Str1k) assigned to this interface becomes greater than a value DM1 of the available throughput rate effectively offered at the instants considered by the given interface INT1. These means of analysis will then send out firstly a setting signal Tun(Str, Dr) intended for the entity sending the stream Str which will thus receive an instruction to set the throughput rate of the stream at a value Dr and, secondly, a switching signal Cm(Str, Int) intended for a command module ISM of the switching means SWM and carrying an identifier Int of the interface which must be assigned to the stream Str. The analysis means QNA thus have the possibility of increasing or reducing the throughput rate assigned to the stream Str or even have the possibility of ordering its re-assignment to an interface other than its current interface by producing an interface identifier Int distinct from the one currently assigned to said stream Str, the type of the new interface being chosen by descending order of preference within the set of types of interfaces with which this stream is compatible. To this end, the control module ISM will decode the switching signal Cm(Str,Int) and will produce a control signal Iswc to control the switching means SWM in order to execute the instructions conveyed by said switching signal Cm(Str,Int). If, in the example described here, the switching module ISM is placed outside the means of analysis QNA, this control module ISM could be integrated into the very means of analysis QNA in other modes of implementation of the invention.

Figure 2:
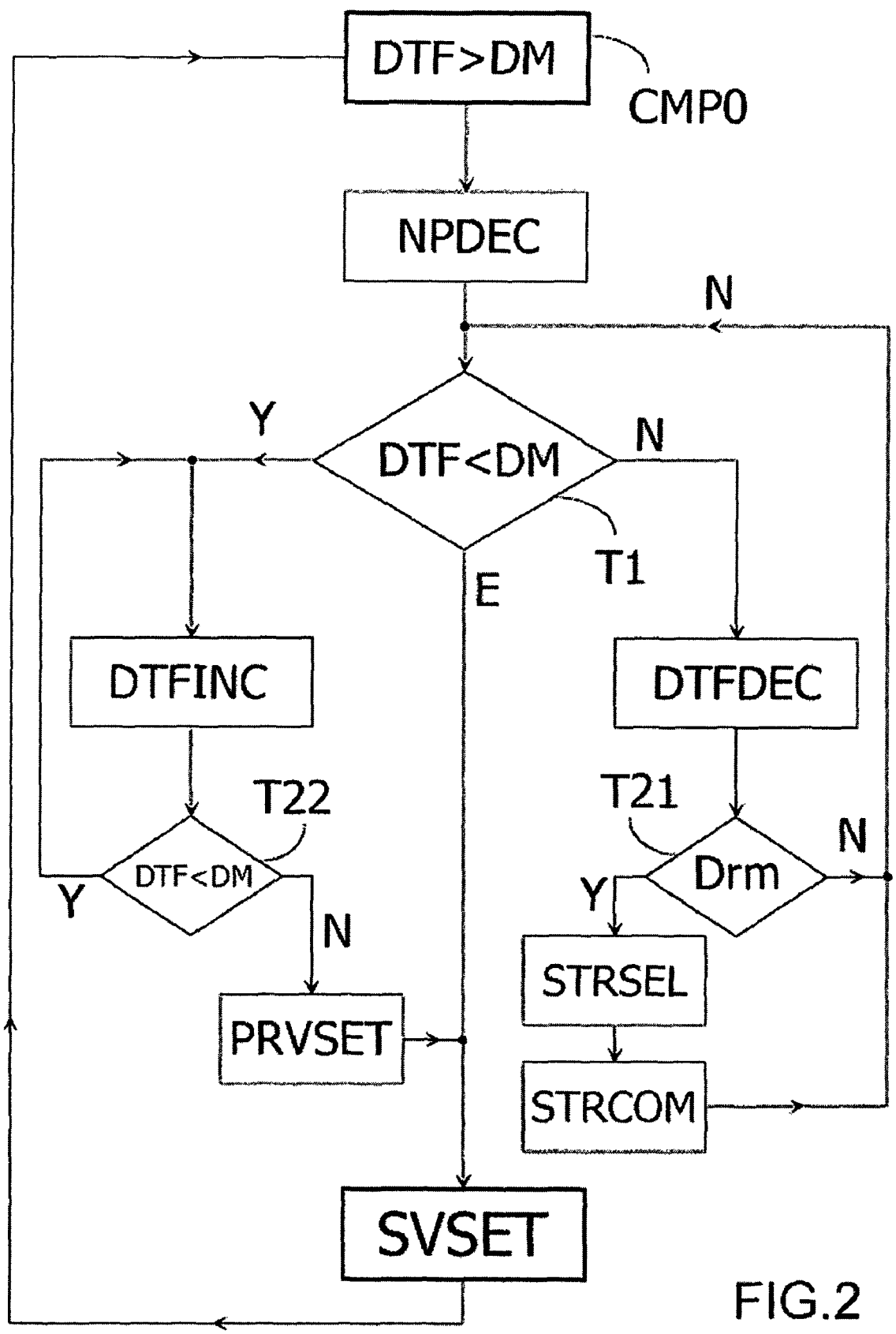
FIG. 2 is a sequential diagram representing a method compliant with an advantageous mode of implementation of an embodiment of the invention.

FIG. 2 is an illustration, in the form of a step diagram, of the operation of a data transmission method that permits optimal management of the resources offered by a particular interface in compliance with a particular mode of implementation of the invention. This method is distinguished in that it includes an initial comparison step CMP0 during which a cumulative value DTF resulting from a sum of throughput rate values associated with the various streams to which the particular interface has been assigned is compared with a maximum value DM of the throughput rate offered by said particular interface at the instant considered. When it is noted that the cumulative throughput rate DTF is greater than the maximum throughput rate value DM, a step NPDEC for the reduction of the throughput rates of the non-priority streams is executed. A step comprising a first type of test T1 is then executed for the purpose of determining whether the reduction of the throughput rates of the non-priority stream has been sufficient to decongest the interface. This is done by comparing the maximum throughput rate value DM with a new cumulative value DTF obtained after execution of the setting step. If not, a step DTFDEC for reduction of the throughput rates of the priority streams is executed. This reduction done here by stages, i.e. after the value of the throughput rate of a priority stream has been replaced by its immediately lower nominal value, a new first type of test T1 step will be executed to determine whether the newly performed reduction has been sufficient to decongest the interface. Thus, as explained here above, various steps DTFDEC for reduction of the throughput rates allocated by the interface to the priority streams could be executed according to several possible alternative modes of operation. It is thus possible to choose a first option in which several successive reductions are made on several distinct streams to which a same degree of priority has been allocated so as to penalize none of these streams relative to its peers. It is possible, on the contrary, to choose a second option in which the reduction of the throughput rate of a particular stream is continued until its minimum value is reached so that it is only then that the reduction of the throughput rate of another stream to which a same degree of priority has been allocated begins and so on and so forth until the interface has been decongested. It is furthermore possible to envisage the implementation for each stream of only one throughput rate reduction operation designed to lower this throughput rate to its minimum value in one stroke.

On the assumption that the throughput rates of the different priority values have all been reduced to their minimum value Drm without the interface being thereby decongested, this point being determined through a second step for a second type of test T2 combined iteratively with the step for a first type of test T1, then one of the streams showing the lowest degree of priority will be selected during a selection step STRSEL to be subjected to a switching operation and redirected to another interface during a switching step STRCOM. If several streams have a same minimum degree of priority, an arbitrary selection among these streams will be made during the selection step STRSEL for the purpose of choosing that one of the streams which will be subjected to the switching step. A new step for performing a first type of test T1 will then make it possible to determine whether this switching will be sufficient to decongest the interface, which amounts to making an a posteriori comparison between the minimum throughput rate Drm of the stream selected with the available throughput rate offered to this stream by its current interface. So long as the interface is saturated, non-priority streams will be subjected to new switching steps STRCOM.

Assuming that all the streams having a degree of priority lower than a predetermined threshold have been subjected to the switching step STRCOM without the interface being thereby decongested, one or more priority streams would have been to be subjected in turn to the switching step STRCOM. The stream selected to this end during the selection step STRSEL will then be the one whose minimum throughput rate Drm makes it possible, when subtracted from the value of the cumulative throughput rate DTF of the streams traveling through the interface considered, to obtain a value that is the closest value to that of the available throughput rate DM offered by this interface.

In one mode of implementation of the invention other than the one represented here, the selection of the stream to be subjected to the switching step STRCOM could be done according to a sequence which is the reverse of the one described here above, a sequence according to which the stream preferably subjected to the switching step STRCOM will be that one of the streams whose disappearance will enable the attaining of a cumulative value DTF that is closest to the maximum throughput rate value DM offered by the interface, independently of the degree of priority of this stream, the degrees of priority being then designed to be taken into account only in the presence of two streams whose disappearance would produce identical effects in terms of release of bandwidth.

It is furthermore quite possible, in certain other modes of implementation of the invention, to envisage the performance of a switching step STRCOM compliant with the above description immediately after a saturation of the interface concerned has been detected, i.e. without any preliminary reduction of throughput rate. In such a situation, the streams that could be redirected to other interfaces without affecting the quality of service related to these streams could be effectively subjected to an equivalent number of respective switching steps STRCOM until the interface considered is decongested. It could however happen that certain streams, known as non-switchable streams, for example streams conveying audiovisual programs in real time for which any potential of interruption is in principle ruled out, remain under the responsibility of the interface considered, after reassignment of all the non-switchable streams and that the interface considered is still saturated under the load of said non-switchable streams. It will then be possible to make reductions in the throughput rates of said non-switchable streams according to the previous modalities, in order to decongest the interface considered.

The iterative process described here above will continue until the available throughput rate DM again becomes greater than or equal to the value of the cumulative throughput rates DTF. In the event of perfect equality, the setting thus obtained is saved during a step SVSET for validation of the parameters. This step will itself be followed by a new comparison step CMP0 in order to carry out constant monitoring of the conditions of communication of the interface thus enabling the configuration to be adapted dynamically.

It could furthermore happen, in very unfavorable circumstances, that the sequences of reduction and switching steps described further above do not lead to a decongestion of the interface considered in which case it can be necessary to perform a step of elimination of one or more particular streams which could be chosen by ascending or descending order of priority or again as a function of the bandwidth released by the elimination of said streams, by transposition of the above explanations, an elimination step of this kind being not illustrated here but being designed to be inserted between a switching step STRCOM and a step for a test of the first type T1.

If a step for a test of the first type T1 reveals on the contrary that there remains a fragment of bandwidth available, a following step DTFINC for increasing the throughput rate of a stream having the higher degree of priority will be performed, for example by the selection of its nominal throughput rate value immediately greater than its current throughput rate value, said step DTFINC for increasing the throughput rate being followed by a step for a test of a third type T22 aimed at determining whether this increase has had the effect of again saturating the interface. If this is the case, it is the preceding throughput rate setting that will be saved during a step PRVSET for validation of the parameters. If not, a new step DTFINC for increasing the throughput rate will be executed and then subjected to validation by a new step for the third type of test T22, the different streams subjected to successive steps DTFINC for increasing the throughput rate being chosen by descending order of priority.

These increasing steps are used to complete the optimizing of the management of bandwidth of the interface considered when an embodiment of the invention thus performs a dynamic and almost real-time reduction of the resources devoted by said interface to the transit of the streams having the lowest priority to the benefit of an increase in the resources devoted to the streams having the highest priority.

One aspect of the present disclosure aims to propose a method of data transmission implemented within a terminal provided with multiple interfaces, a method according to which the phenomena of congestion of one or more interfaces will be immediately detected and swiftly taken into account so as to prevent, to the extent possible, any interruption of streams because of saturation of the corresponding interface.

Although the present disclosure has been described with reference to one or more examples, workers skilled in the art will recognize that changes may be made in form and detail without departing from the scope of the disclosure and/or the appended claims.

The invention claimed is:

1. A method comprising:
   transmission of data within a telecommunications system including at least one terminal capable of exchanging data streams with numerous communications networks through a plurality of interfaces of the terminal,
   at least one step of comparison between a maximum throughput rate value offered by an interface through which a particular stream travels and a cumulative value resulting from a sum of throughput rate values to be assigned to the streams effectively traveling through said interface, and
   at least one switching step during which another interface of the terminal is assigned to said stream when the maximum throughput rate value offered is lower than the cumulative value, which comprises a step of selecting one of the streams, called a selected stream, having a minimum throughput rate that obtains a value that is closest to the value of the maximum throughput rate offered by the interface, when the minimum throughput rate of the selected stream is subtracted from the sum of the values assigned to the streams traveling through the interface, the selected stream then being subjected to the switching step.

2. The method according to claim 1, wherein the method furthermore includes a step of classification, in a predetermined order of priority, of the various streams assigned to each interface, the streams that have to be subjected to a switching step being then selected by ascending order of priority.

3. The method according to claim 1, wherein the step of selecting comprises determining several acceptable nominal throughput rate values for at least one of the streams, the smallest of said nominal throughput rates constituting the minimum throughput rate proper to said stream, any subjecting of the stream considered at the switching step being inhibited so long as the throughput rate effectively allocated by the interface to said stream considered has not been reduced to its minimum value.

4. The method according to claim 3, wherein any subjecting of the stream to the switching step is inhibited so long as the throughput rates effectively allocated by the interface to the streams that cross the interface have not all been reduced to their respective minimum values.

5. The method according to claim 3, wherein the method furthermore includes a step of increasing the throughput rate that follows a switching step and increases the throughput rate of a particular stream subjected to the step of switching by selection of the particular stream's nominal throughput rate value immediately higher than the particular stream's current throughput rate.

6. A telecommunications system comprising:
   at least one terminal capable of exchanging data streams with numerous communications networks through a plurality of interfaces of the terminal, wherein the at least one terminal comprises:
   means of comparison between a maximum throughput rate value offered by an interface through which a particular stream travels and a cumulative value resulting from a sum of throughput rate values to be assigned to the streams effectively traveling through said interface, and
   switching means capable of assigning another interface of the terminal to said particular stream when the maximum throughput rate value offered is lower than the cumulative value, wherein assigning comprises selecting one of the streams, called a selected stream, having a minimum throughput rate that obtains a value that is closest to the value of the maximum throughput rate offered by the interface, when the minimum throughput rate of the selected stream is subtracted from the sum of the values assigned to the streams traveling through the interface.

7. A terminal comprising:
   a plurality of interfaces through which the terminal is capable of exchanging data streams with numerous communications networks,
   means for comparing between a maximum throughput rate value offered by an interface through which a particular stream travels and a cumulative value resulting from a sum of throughput rate values assigned to streams effectively traveling through said interface, and
   switching means for assigning another interface of the terminal to said particular stream when the maximum throughput rate value offered is lower than the cumulative value, wherein assigning comprises selecting one of the streams, called a selected stream, having a minimum throughput rate that obtains a value that is closest to the value of the maximum throughput rate offered by the interface, when the minimum throughput rate of the selected stream is subtracted from the sum of the values assigned to the streams traveling through the interface.

8. A computer program product stored in at least one of a non-transitory memory of a central processing unit or a non-transitory memory designed to cooperate with a reader of said central processing unit, said program being designed to be implemented within a terminal capable of exchanging data streams with numerous communications networks through a plurality of interfaces, said program including:
   at least one instruction ordering execution of a step of comparison between a maximum throughput rate value offered by an interface through which a particular stream travels and a cumulative value resulting from a sum of throughput rate values assigned to streams effectively traveling through said interface, and
   at least one instruction ordering execution of a switching step during which another interface of the terminal is assigned to said stream when the maximum throughput rate value offered is lower than the cumulative value, which comprises selecting one of the streams, called a selected stream, having a minimum throughput rate that obtains a value that is closest to the value of the maximum throughput rate offered by the interface, when the minimum throughput rate of the selected stream is subtracted from the sum of the values assigned to the streams traveling through the interface, the selected stream then being subjected to the switching step.

9. A non-transitory storage medium in which there is stored a computer program compliant with claim 8.

10. A method comprising:
    generating with a terminal a signal conveying a data stream, said signal including at least one field defining a nominal throughput rate forming a component of a cumulative value resulting from a sum of throughput rate values to be assigned to data streams effectively traveling through an interface selected from a plurality of interfaces included in the terminal, said cumulative value being compared, within said terminal, with maximum throughput rate offered by this interface;

assigning another interface of the terminal to a selected data stream when the maximum throughput rate value offered is lower than the cumulative value, which comprises selecting one of the data streams, called the selected data stream, having a minimum throughput rate that obtains a value that is closest to the value of the maximum throughput rate offered by the interface, when the minimum throughput rate of the selected stream is subtracted from the sum of the values assigned to the streams traveling through the interface, the selected data stream then being subjected to the switching step; and transmitting the signal by the terminal, through the selected interface.

11. A method comprising:

transmission of data within a telecommunications system including at least one terminal capable of exchanging data streams with numerous communications networks through a plurality of interfaces of the terminal, wherein the method comprises:

at least one step of comparison between a maximum throughput rate value offered by an interface through which a particular stream travels and a cumulative value resulting from a sum of throughput rate values to be assigned to the streams effectively traveling through said interface, at least one switching step performed when the maximum throughput rate value offered is lower than the cumulative value, which comprises selecting one of the streams, called a selected stream, having a minimum throughput rate that obtains a value that is closest to the value of the maximum throughput rate offered by the interface when the minimum throughput rate of the selected stream is subtracted from the cumulative value and assigning another interface of the terminal to said selected stream.

* * * * *